United States Patent
Chiskis et al.

(12) 
(10) Patent No.: US 6,526,427 B1
(45) Date of Patent: Feb. 25, 2003

(54) METHOD OF MASK CALCULATION FOR GENERATION OF SHIFTED PSEUDO-NOISE (PN) SEQUENCE

(75) Inventors: Alexander Chiskis, Tel-Aviv (IL); Dotan Sokolov, Ra'anana (IL); Doron Rainish, Ramat Gan (IL)

(73) Assignee: D.S.P.C. Technologies Ltd., Petach Tikva (IL)

( * ) Notice: Subject to any disclaimer, the term of this patent is extended or adjusted under 35 U.S.C. 154(b) by 0 days.

(21) Appl. No.: 09/455,001

(22) Filed: Dec. 6, 1999

(51) Int. Cl.[7] .............................. G06F 1/02; H03K 3/84
(52) U.S. Cl. ..................................................... 708/250
(58) Field of Search .................................. 708/250–256

(56) References Cited

U.S. PATENT DOCUMENTS

| | | | |
|---|---|---|---|
| 5,532,695 A | * 7/1996 | Park et al. | 708/250 |
| 5,926,070 A | * 7/1999 | Barron et al. | 708/250 |
| 6,014,408 A | * 1/2000 | Naruse | 708/250 |
| 6,141,374 A | * 10/2000 | Burns | 708/250 |

FOREIGN PATENT DOCUMENTS

EP    0901236 A2    3/1999

OTHER PUBLICATIONS

Tsao, S.H., "Generations of delayed replicas of maximal–length linear binary sequences", *Proc. Inst. Elec. Engrs.* (London) 111, No. 11, 1964, pp. 1803–1807.

Roberts, P.D., Davies, A.C., and Tsao, S.H., "Discussion on generation of delayed replicas of maximal length binary sequences", *Proc. Inst. Elec. Engrs.* (London) 112, No. 4, Apr. 1965, pp. 702–704.

Miller, A., Brown, A. and Mars, P., "A simple technique for the determination of delayed maximal length binary sequences", *IEEE Trans. Computers* C–26, No. 8, Aug. 1977, pp. 808–811.

Peterson, R.L., Ziemer, R.E., and Borth, D.E., *Introduction to Spread Spectrum Communications*, Prentice Hall, New Jersey (1995). pp. v–xi.

"M–sequences: what they are and how they can be implemented", *The April Spread Spectrum Sourcebook*, Appendix A, Publication No. 121 of the Radio Amateur's Library, The American Radio Relay League, USA. pp. 10–24 thru 10–54.

Ireland, B. and Marshall, J., "Matrix method to determine shift–register connections for delayed pseudo–random binary sequences", *Electron. Letters*, 4, No. 21, 1968, pp. 467–468.

Davies, A., "Delayed versions of maximal–length linear binary sequences", *Electron. Letters*, 1, No. 3, May 1965, pp. 61–62.

Van Luyn, A.N., "Shift register connections for delayed versions of m–sequences", *Electron. Letters*, 14, No. 22, Oct. 1978, pp. 713–715.

Yiu, K.P., "A simple method for determination of feedback shift register connections for delayed maximal–length sequences", *Proc. IEEE* 68, No. 4, Apr. 1980, pp. 537–538.

* cited by examiner

*Primary Examiner*—David H. Malzahn
(74) *Attorney, Agent, or Firm*—Eitan, Pearl, Latze & Cohen-Zedek

(57) ABSTRACT

A method for calculating the mask for an arbitrary delay of a pseudo-noise sequence uses only XOR operations on previously calculated masks. A method for calculating the mask for an arbitrary delay of a pseudo-noise sequence whose shift register polynomial is of order R uses no more than $N_{OP}$ operations where $N_{OP}$ is independent of the delay and $N_{OP}$ is on the order of R.

7 Claims, 8 Drawing Sheets

METHOD OF MASK CALCULATION FOR GENERATION OF SHIFTED PSEUDO-NOISE (PN) SEQUENCE

FIELD OF THE INVENTION

The present invention relates to spread-spectrum communications, in general, and to calculations of masks for generation of shifted pseudo-noise (PN) sequences, in particular.

BACKGROUND OF THE INVENTION

In direct sequence spread-spectrum communications, a pseudo-noise (PN) sequence is used for spreading an information signal. The PN sequence, is typically a long binary sequence. In the IS-95 standard, for example, the length of the PN sequence is $2^{15}$. In the wideband code division multiple access (W-CDMA) standard, the lengths are $2^{18}$ and $2^{42}$.

One technique for generating PN sequences is through the use of a maximum length shift register, as shown in FIG. 1, to which reference is now made. A linear feedback shift register 100 having R bits is connected in a feedback loop to a XOR unit 102. Initially, shift register 100 contains an R-bit integer. A single bit B is output from shift register 100 with every tick of a clock (not shown), The output bit B may be, for example, the least significant bit of shift register 100, or may be a more complex combination of the bits of shift register 100. XOR unit 102 is connected to particular bits of shift register 100 in a feedback loop.

In the example shown in FIG. 1, for each tick of the clock: a) XOR unit 102 performs a XOR operation an the contents of bit 2, bit 3 and bit (R–1) of shift register 100, b) shift register 100 is shifted to the right by one bit, outputting as output bit B the contents of bit 1, and c) the result of the XOR operation is stared in bit R of shift register 100. The procedure is repeated for each tick of the clock, thereby producing a sequence X of output bits B.

The R-bit integer stored in shift register 100 at any given time is known as the "state" of shift register 100. Clearly there are $2^R$ possible states of shift register 100. As the clock marks $2^R-1$ ticks, shift register 100 cycles through $2^R-1$ possible states (excluding the zero state). The resultant sequence X of output bits B, with a zero added, has a periodicity of $2^R$, is said to have a length of $2^R$, and is known as a maximal length linear binary sequence. For some feedback arrangements, however, the sequence is not a maximal length sequence. Rather, for these arrangements, shift register 100 cycles through only some of the $2^R-1$ possible states, resulting in a sequence X of output bits B having a periodicity of less than $2^R$.

The sequence X satisfies a polynomial, for example $h(X)=X^{18}+X^7+1=0$, where $X^0\equiv 1$ is the unshifted sequence X, $X^7$ is the sequence X shifted by a delay of 7, $X^{18}$ is the sequence X shifted by a delay of 18, and the summation is a XOR-operation. What the polynomial represents is the fact that if the sequence X and its shifted versions for delays of 7 and 18 are XOR added, the result is a sequence of all zero bits. The polynomial h(X) is chosen so that the sequence X is noisy. However, since the sequence X is periodic and not truly noisy, the sequence is called a pseudo-noise (PN) sequence.

In direct sequence spread-spectrum communications, it is frequently necessary to calculate in real-time a shifted version of the PN sequence, where the shift, also known as the "delay", is unknown prior to real-time and may be of the order of the size of $2^R$. As is known in the art, calculation of a shifted version of a PN sequence is accomplished in hardware using a mask. FIG. 2, to which reference is now made, is a schematic illustration of a prior art hardware system for calculating an arbitrary shifted version of a PN sequence. As in FIG. 7, shift register 200 has R bits and is connected to a XOR unit 202 in a feedback loop. The R bits of shift register 200 are connected via R switches 204 to a XOR unit 206. A mask M(d) for a delay d indicates which of the switches 204 are closed and which are open. XOR unit 206 sums the contents of the bits whose switches 204 are closed and produces an output bit B'. For each tick of the clock, the contents of shift register 900 change according to the feedback loop, and the resulting output bit B' produced by XOR unit 206 reflects this change. If the PN sequence comprising the output bits B is denoted S[n], the shifted PN sequence comprising the output bits B' is denoted S[n–d].

Mask M(d) can be represented as a binary vector of length R, $[c_{R-1}(d)\ c_{R-2}(d)\ldots c_i(d)\ c_0(d)]$, where $c_i(d)$ has a value of 1 when the ith switch should be closed and a value of 0 when the ith switch should be open.

Mask M(d) can also be represented as a polynomial. For example, the polynomial $X^{12}+X^5+X^0$ indicates that the switches for bits 12, 5 and 0 of shift register 100 are closed, and all the other switches are open. In general, for an arbitrary delay d, the mask M(d) that determines which of the switches to close and which to open in order to calculate the PN sequence that is shifted by the delay d is given by:

$$M(d) = \sum_{i=0}^{R-1} c_i(d) X^i,$$

where i is an index for the R switches and the R bits of the shift register, and $c_i(d)$ is as defined hereinabove, and X' denotes the sequence X, shifted by a delay of i.

The task of calculating an arbitrary shifted version of a PN sequence is therefore equivalent to the task of mask calculation. The goal is to find a method for calculating the mask for an arbitrary delay, even a large delay, quickly and with minimum use of valuable memory and power resources.

The most trivial solution would be to calculate in advance the mask for every one of the possible $2^R$ delays, and to store the resulting $2^R$ R-bit integers in memory. Then during online operation, when the arbitrary delay becomes known, the appropriate R-bit mask is read from the memory. Since R typically has a value of 15 or 18, this solution is impractical due to its requirement of a huge dedicated memory.

The articles "Generation of delayed replicas of maximal-length linear binary sequences", S. H. Tsao, *Proc. Inst. Elec. Engrs.* (London) 111, No. 11, November 1964, pp. 1803–1807, and "Discussion on generation of delayed replicas of maximal length binary sequences", P. D. Roberts, A. C. Davies and S. H. Tsao. *Proc. Inst. Elec. Engrs.* (London) 112, No. 4, April 1965, pp. 702–704, are among the earliest to deal with delays in shift registers. However, the methods described therein are not appropriate for handling large delays.

Algorithms that are capable of handling large delays are either matrix fast multiplication methods or polynomial fast division methods. For sparse matrices or sparse polynomials other methods based on this sparseness may be used in particular, the article "A simple technique for the determination of delayed maximal length binary sequences", A. Miller, A. Brown and P. Mars, *IEEE Trans. Computers C-26*, No. 8, August 1977, pp. 808–811, describes a tree-like structure representation for trinomials, but this algorithm does not outperform fast polynomial division.

Matrix multiplication algorithms are based on the state machine representation of the shift register, as described in R. L. Peterson, R. E. Ziemer and D. E. Borth, *Introduction to Spread Spectrum Communications*, Prentice Hall, New Jersey (1995) and in "M-sequences: what they are and how they can be implemented", *The April Spread Spectrum Sourcebook*, Appendix A, Publication No. 121 of the Radio Amateur's Library, The American Radio Relay League, USA. The multiplication process may be optimized by the so-called logarithmic (usually loge) route corresponding to the binary representation of the delay d , This is described in "Matrix method to determine shift-register connections for delayed pseudo-random binary sequences", B. Ireland and J. Marshall, *Electron. Letters*, 4, No. 21, 1968, pp. 467–468 and in "M-sequences: what they are and how they can be implemented", *The April Spread Spectrum Sourcebook*, Appendix A. Such algorithms have a number of operations $N_{OP}$ on the order of $R^2 \log_2 d$.

Currently, the polynomial approach is the source of the best known algorithms. All such algorithms are based on the Davies theorem, described in "Delayed versions of maximal-length linear binary sequences", A. Davies, *Electron. Letters*. 1, No. 3, May 1965, pp. 61–62, that for a delay d, the corresponding mask M(d) is calculated as $X^d \bmod h(X)$ where h(X) is the shift register polynomial of order R. The articles "Shift register connections for delayed versions of m-sequences", A. N. Van Luyn. *Electron. Letters*.14, No. 22, October 1978, pp. 713–715, and "A simple method for determination of feedback shift register connections for delayed maximal-length sequences", K. P. Yiu. *Proc. IEEE* 68 No. 4, April 1980, pp. 537–538, propose fast realizations of this long division based on different $\log_2$ routes. Such algorithms have a number of operations $N_{OP}$, on the order of $R \log_2 d$.

European Patent Application EP0901236 to Matsushita Electric Industrial Co., Ltd., published Mar. 10, 1999, describes a PN code generator using polynomial division and look-up tables. According to this method, only equidistant masks are used. The usual long-polynomial division further calculates a fine mask.

BRIEF DESCRIPTION OF THE DRAWINGS

The present invention will be understood and appreciated more fully from the following detailed description taken in conjunction with the appended drawings and appendices in which.

Figure 6:
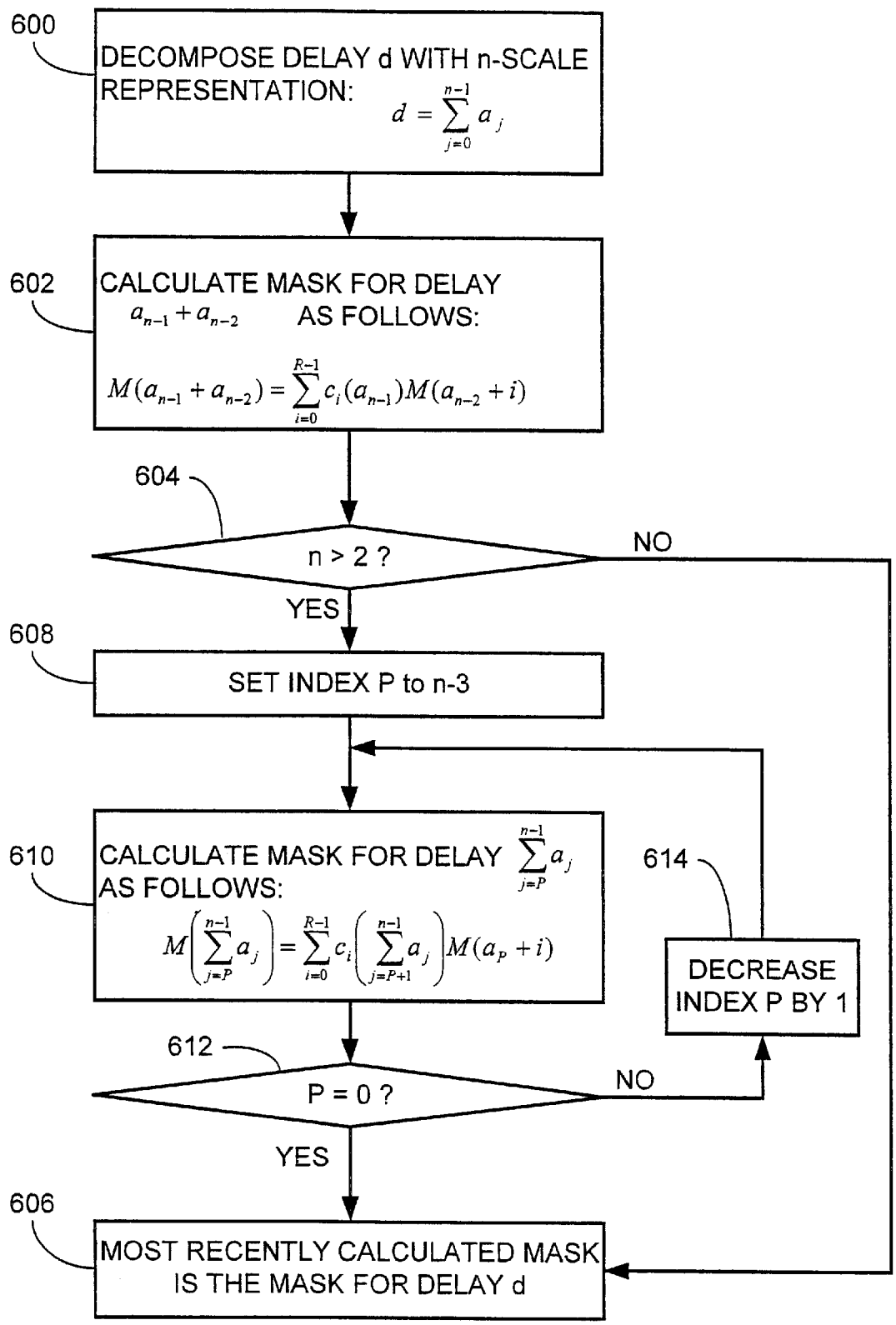
FIG. 6 is a flowchart illustration of a mask calculation method in accordance with a preferred embodiment of the present invention.

Appendix A is a derivation of a mask relation, helpful in understanding the present invention;

Appendix B is derivation of the total number of masks required by the method of FIG. 6, in accordance with a preferred embodiment of the present invention; and Appendix C is a derivation of the minimal size of the look-up table in the case of a general n-scale representation, in accordance with a preferred embodiment of the present invention.

DETAILED DESCRIPTION OF THE PRESENT INVENTION

The present invention is directed to a method for mask calculation for generation of pseudo-noise (PN) sequences shifted by an arbitrary delay. The method is applicable to PN sequences that are maximal length sequences and to PN sequences that are not.

Figure 1:
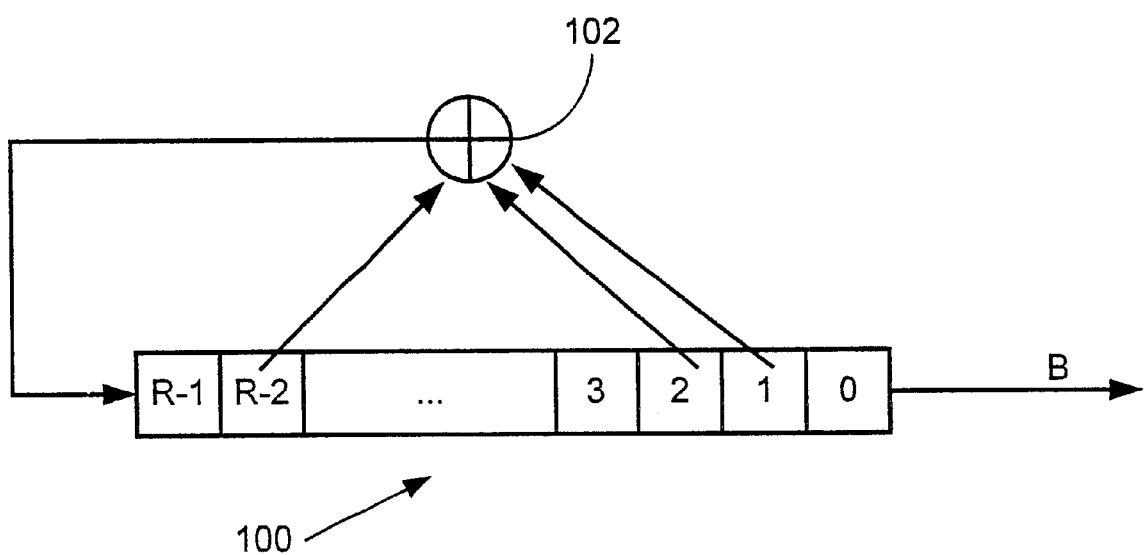
FIG. 1 is a schematic illustration of a maximum length shift register used for generating pseudo-noise (PN) sequences, as is known in the art.
Figure 2:
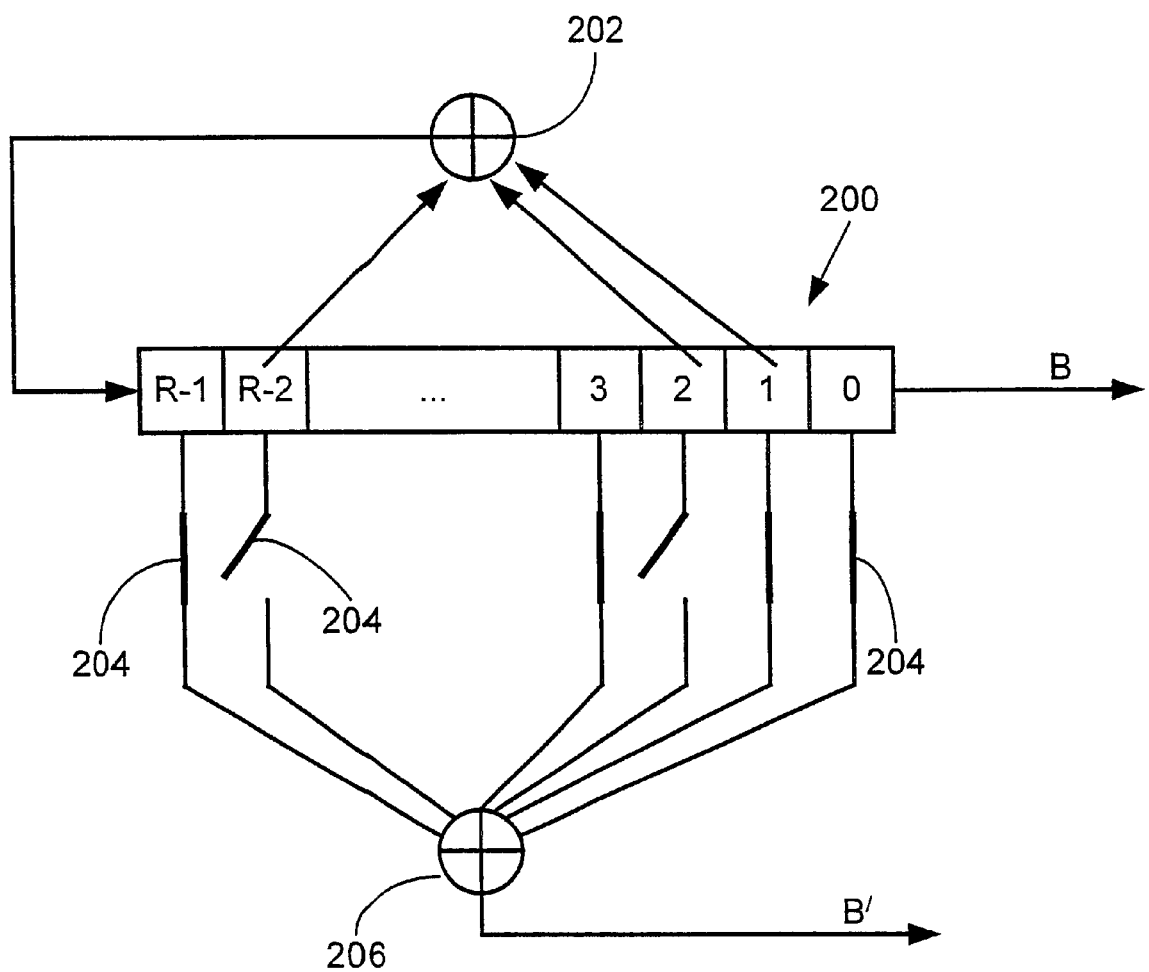
FIG. 2 is a schematic illustration of a hardware arrangement for calculating an arbitrary delay of a PN sequence, as is known in the art.
Figure 3:
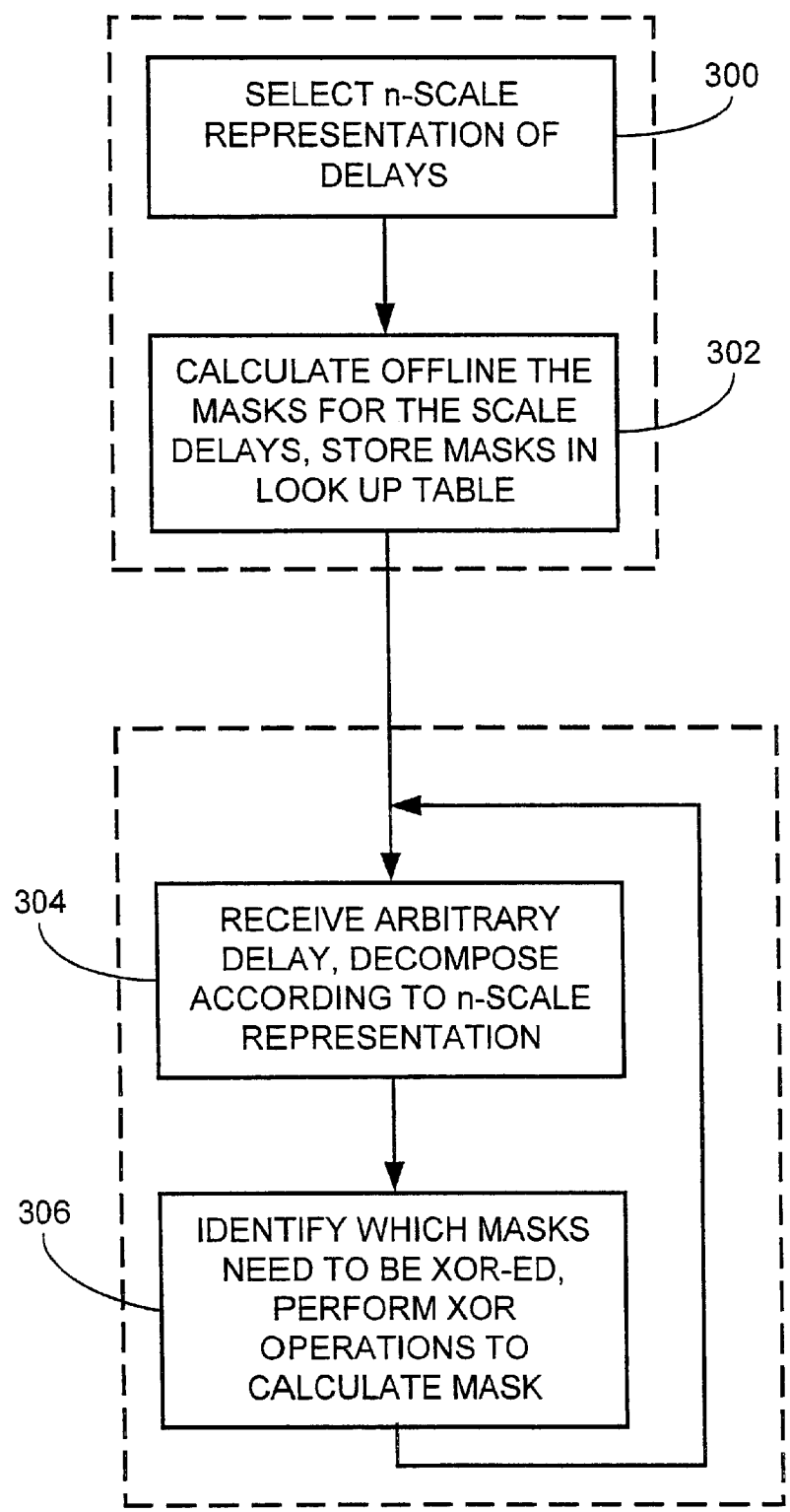
FIG. 3 is a flowchart illustration of a mask calculation method in accordance with a preferred embodiment of the present invention.

According to a preferred embodiment of the present invention, the mask calculation is a series of XOR additions of masks stored in a look-up table. Throughout the specification and the claims, the term "look-up table" is used to mean both a single look-up table and a plurality of look-up tables. The masks in the look-up table are calculated offline according to a predetermined n-scale representation, and the identification of which masks need to be used in the XOR addition is made online, when the arbitrary delay becomes known. This is shown in FIG. 3, to which reference is now made, which is a flowchart illustration of the mask calculation method according to a preferred embodiment of the present invention.

An n-scale representation for delays is selected (step 300). Then masks for the n scales are calculated and stored in a look-up table (step 302). Steps 300 and 302 are performed offline. An arbitrary delay is received and is decomposed according to the n-scale representation selected in step 300 (step 304). The mask for the arbitrary delay is calculated from XOR operations on selected ones of the masks stored in the look-up table in step 302 (step 306). Steps 304 and 306 are performed online for each arbitrary delay for which a mask must be calculated.

As will be explained hereinbelow, as the dimension n of the representation space increases, the number of XOR operations in step 306 increases, and the size of the look-up table decreases. Therefore, there is a trade off between the speed of the mask calculation method and the size of the storage memory required.

The mask calculation of step 306 uses the following relation for masks, which is derived in Appendix A:

$$M(a+b) = \sum_{i=0}^{R-1} c_i(b) M(a+i), \quad \text{(Eq. 1)}$$

where M(a+b) is the mask for the delay a+b, R is the length of the maximum length shift register, $c_i(b)$ are the binary coefficients of the mask for the delay b, and the sum is addition modulus 2 (XOR).

Figure 4:
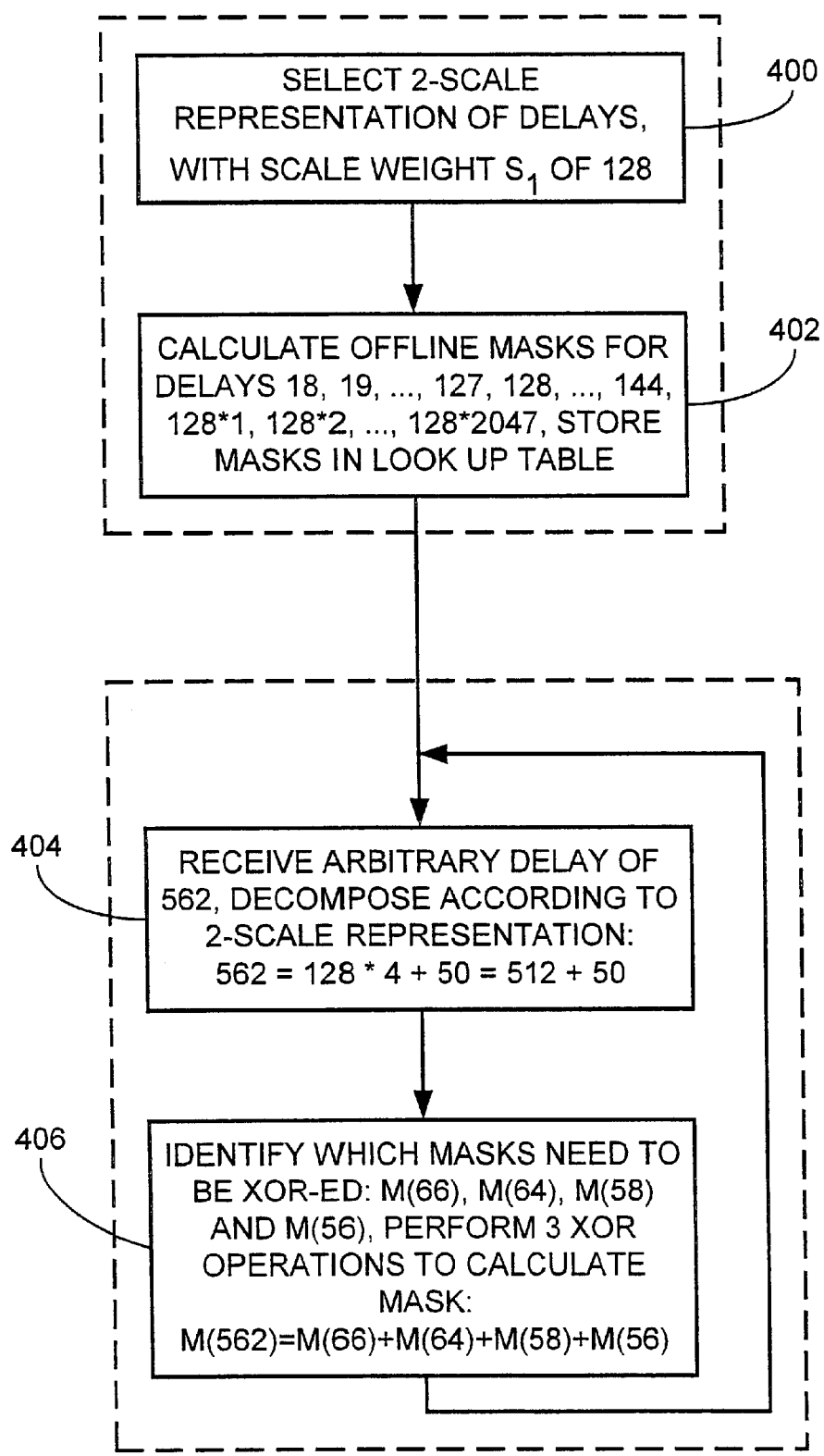
FIG. 4 is a particular example of the method shown in FIG. 3.

An example of the method of FIG. 3 will now be described with respect to FIG. 4, to which reference is now made. FIG. 4 is a flowchart illustration of a particular example of the method shown in FIG. 3. In the example shown in FIG. 4, the length of the pseudo-noise (PN) sequence is $2^{18}$ (R is 18), and the polynomial for the PN sequence is $h(X)=X^{18}+X^7+1=0$. The goal is to calculate masks for delays from 0 to the maximal delay of $N=2^{18}-1$. A 2-scale representation having a scale weight $S_i$ of 128 is chosen in step 400, so that every delay d is decomposed into a multiple of 128 and a remainder, $d=128*d_i+d_0$. The mask for the arbitrary delay d is calculated by no more than 17 XOR operations, due to Equation 1:

$$M(128*d_1 + d_0) = \sum_{i=0}^{17} c_i(128*d_1)M(d_0 + i), \quad \text{(Eq. 2)}$$

where masks $M(128*d_{,1})$ for $d_1=1, \ldots, 2047$ and masks $M(q)$ for $a=0,1, \ldots, 127,128, \ldots, 144$ need to be stored in a look-up table. Since, as shown in Appendix B, masks $M(q)$ for $q=0,1, \ldots, 17$ can be easily generated on the fly, only masks $M(q)$ for $q=18,19, \ldots, 127,128, \ldots, 144$ need to be stored in the look-up table. The total required number of masks in the took-up table is thus $127+2047=2174$, which includes masks $M(18)$, $M(19)$, ..., $M(144)$, $M(128*1)$, $M(128*2)$, ..., $M(128*2047)$. These masks are calculated offline in step 402 and are stared in a look-up table of 2174 masks (each mask is an 18-bit integer).

It will be appreciated that we counted mask $M(128)$ twice, so the actual number of distinct masks is actually 2173. However, for ease of implementation, it is sometimes desired to have this mask stored twice.

It will also be appreciated that the actual number of XOR operations may be less than 17, since some of the binary coefficients $c_i(128*d_1)$ may be zero. This is apparent from a particular example, for example a mask calculation for a delay of 562. In step 404, an online mask calculation for a delay of 562 is required. The decomposition of 562 according to the representation is $562=128*4+50=512+50$ (step 404). Using the relation given in Eq. 2 and substituting the value 4 for d, and the value 50 for $d_0$, it is apparent that the mask $M(562)$ for a delay of 562 can be calculated from the mask $M(512)$ for a delay of 512 and from selected other masks:

$$M(562) = M(50 + 512) = \sum_{i=0}^{17} c_i(512)M(50 + i). \quad \text{(Eq. 3)}$$

The mask $M(512)$ for a delay of 512, calculated offline and stored in the look-up table, is $$M(512)=X^{16}+X^{14}+X^8+X^6,$$

and therefore the non-zero binary coefficients of the mask $M(512)$ are $c_{16}(512)$, $c_{14}(512)$, $c_8(512)$ and $c_6(512)$. Consequently, the sum in Eq. 3 is reduced to the following:

$$M(562)=M(50+16)+M(50+14)+M(50+8)+M(50+6)=M(66)+M(64)+M(58)+M(56) \quad \text{(Eq. 4)}.$$

The masks $M(66)$, $M(64)$, $M(58)$ and $M(56)$ were calculated offline in step 402 and stored in the look-up table. The mask $M(562)$ is calculated from the masks $M(66)$, $M(64)$, $M(58)$ and $M(56)$ using 3 XOR operations (step 406).

In another example, if a 2-scale representation having a scale weight $S_1$ of 512 is chosen, so that every delay d is decomposed into a multiple of 512 and a remainder, $d=512*d_1+d_0$, then masks $M(512*d_1)$ for $d_1=1,\ldots,511$ and masks $M(q)$ for $q=0,1,\ldots,511,512,\ldots,528$ need to be stored in a look-up table. Since, as shown in Appendix B, masks $M(q)$ for $q=0,1,\ldots,17$ can be easily generated on the fly, only masks $M(q)$ for $q=18,19,\ldots,511,512,\ldots,528$ need to be stored in the look-up table. The total required number of masks in the look-up table is thus $511+511=1022$, which includes masks $M(18)$, $M(19)$, ..., $M(528)$, $M(512*1)$, $M(512*2)$, ..., $M(512*511)$. These masks are calculated offline and are stored in a look-up table of 1022 masks (each mask code an 18-bit integer).

Figure 5A:
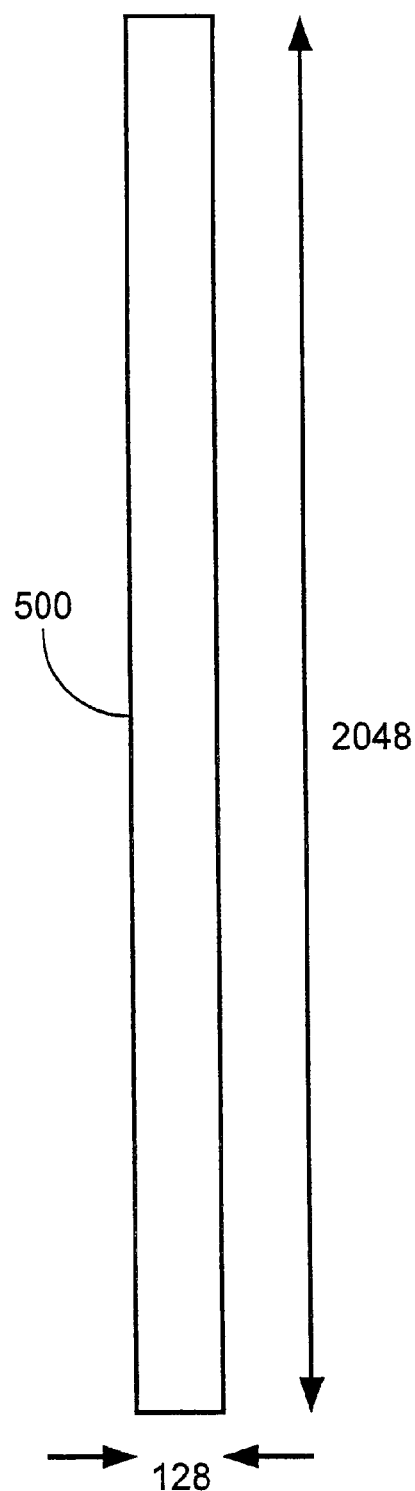
FIGS. 5A and 5B are schematic illustrations of a rectangle and a square, respectively, having the same area, helpful in understanding the present invention.
Figure 5B:
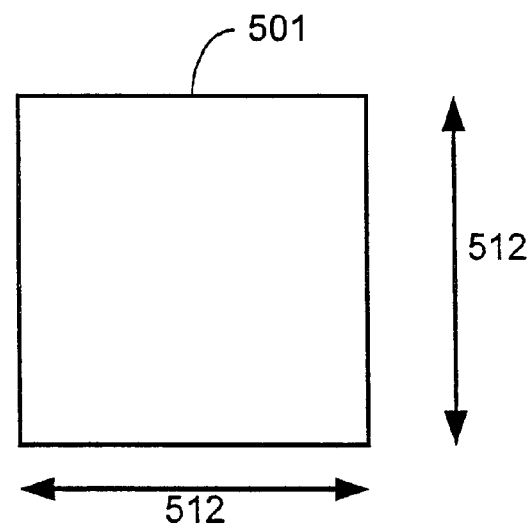

It will be appreciated that by changing the scale weight $S_i$, the size of the look-up table can be reduced without increasing the maximum number of XOR operations. This is clarified in FIGS. 5A and 5B, to which reference is now made, which are schematic illustrations of a rectangle and a square, respectively. From a geometrical perspective, with the 2-scale representation $d=128*d_{,1}+d_0$, the delay d is represented as a point with integer coordinates within or on the border of a rectangle 500 with sides 128×2048, while with the 2-scale representation $d=512*d_1+d_0$, the delay d is represented as a point with integer coordinates within or on the border of a square 501 with sides 512×512. While the area of rectangle 500 and of square 501 is the same ($128*2048=512*512=2^{18}$), it is the sum of the sides (minus a constant, 2), which gives the minimum size of the look-up table. It is obvious that among all rectangles having the same area, the square has the smallest perimeter. Thus, in the present example, for a 2-scale representation and a maximal delay of $2^{18}$, the minimum size of the look-up table is given by the representation $d=512*d_1+d_0$. This simple geometrical idea will be generalized further hereinbelow for n-scale representations.

In general terms, the method enables calculation of a mask for any delay d less than N, where N may be as large as $2^R$. An n-scale representation is selected for delays d:

$$d = d_0 + \sum_{j=1}^{n-1} S_j d_j, \quad \text{(Eq. 5)}$$

where, as will be explained hereinbelow, the scale weights $S_j$ are determined so that the size of the look-up tables is minimized. (The scale weight for the 0th scale is 1 by definition.) Each scale j is occupied by $K_j$ elements, such that $d_j$ runs through all integers from 0 to $K_j-1$. The scale weights $S_j$ are related to the $K_j$ values via the relation:

$$S_j = \prod_{p=0}^{j-1} K_p, \quad \text{(Eq. 6)}$$

i.e. $S_1=K_0$, $S_2=K_0 \cdot K_1 S, \ldots, S_{n-1}=K_0 \cdot K_1 \ldots K_{n-2}$.

Geometrically, an n–dimensional parallelepiped with integer sides of length $K_j$ is built. Every delay value corresponds to a point with integer coordinates that are situated within the parallelepiped. The volume of the parallelepiped is therefore:

$$N = \prod_{j=0}^{n-1} K_j, \quad \text{(Eq. 7)}$$

which is a constraint on the lengths $K_j$.

It is convenient to express the delay as the following sum:

$$d = \sum_{j=0}^{n-1} a_j, \quad \text{(Eq. 8)}$$

where $a_0 = d_0$ and $a_j = S_j d_j$ for $j = 1, \ldots, n1$.

In order to be able to calculate the mask of an arbitrary delay d whose value is anywhere between 0 and N−1, many masks must be calculated offline and stored in the look-up table. Specifically, the mask of each delay $d_0 = \{0, 1, \ldots, K_0-1\}$ and each delay $a_j = S_j d_j$ where $d_j = \{0, 1, \ldots, K_j-1\}$ for each scale j must be calculated.

The method for calculation of the mask M(d) for an arbitrary delay d will now be explained with respect to FIG. 6, to which reference is now made. In step 600, the arbitrary delay d is decomposed with respect to the n-scale representation, resulting in the expression given in Eq. 8, where now $d_0, d_1, d_2, \ldots$ have particular integer values. Next, the mask for the delay $a_{n-1} + a_{n-2}$ is calculated (step 602) as follows, using the mask relation given in Eq. 1:

$$M(a_{n-1} + a_{n-2}) = \sum_{i=0}^{R-1} c_i(a_{n-1}) M(a_{n-2} + i). \quad \text{(Eq. 9)}$$

Step 602 involves R−1 XOR additions and requires the knowledge of the masks for delays $a_{n-2}+i$ for $i=0, \ldots, R-1$. These masks are taken from the look-up table.

Then the value of n is checked (step 604). If the representation is a 2-scale representation, then the mask calculated in step 602 is the desired mask of for the delay d (step 606).

Otherwise, in step 608 an index P is set to n−3, and then the mask for the delay $a_{n-1} + a_{n-2} + a_{n-3}$ is calculated (step 610) as follows, using the mask relation given in Eq. 1:

$$M(a_{n-1} + a_{n-2} + a_{n-3}) = \sum_{i=0}^{R-1} c_i(a_{n-1} + a_{n-2}) M(a_{n-3} + i). \quad \text{(Eq. 10)}$$

Step 610 involves R−1 XOR additions and requires the knowledge of the masks for delays $a_{n-3}+i$ for $i=0, \ldots, R-1$. These masks are taken from the look-up table. Furthermore, step 610 involves the binary coefficients $c_i(a_{n-i} + a_{n-2})$, which are known from the result of the calculation instep 602.

Next the value of the index P is checked (step 642). If it is not zero, then the value of the index P is decreased by 1 (step 614) and the method resumes from step 610.

In terms of the index P, the mask calculation of step 610 is given by:

$$M\left(\sum_{j=P}^{n-1} a_j\right) = \sum_{i=0}^{R-1} c_i\left(\sum_{j=P+1}^{n-1} a_j\right) M(a_P + i), \quad \text{(Eq. 11)}$$

which involves R−1 XOR additions and requires the knowledge of the masks for delays $a_1+i$ for $i=0, \ldots, R-1$. These masks are taken from the look-up table. The binary coefficients $$c_i\left(\sum_{j=P+1}^{n-1} a_i\right)$$

are known either from the mask calculation of step 602 (for the case of P=n−3) or from the mask calculation of step 610 for the previous value of the index P.

When the value of the index P is found to be zero (step 612), the method is complete (step 606) and the most recently calculated mask of step 610 is the mask for the delay d:

$$M(a_{n-1} + a_{n-2} + \ldots + a_0) = \quad \text{(Eq. 12)}$$
$$\sum_{i=0}^{R-1} c_i(a_{n-1} + a_{n-2} + \ldots + a_1) M(a_0 + i).$$

It will be appreciated by those skilled in the art that the total number $N_{OP}$ of XOR operations in the method of FIG. 6 is (n−1)·(R−1) and that the method requires the knowledge of the following masks: $M(a_p+i)$ for $i=0, \ldots, R-1$ and for $P=0, \ldots, n-2$ as well as the mask $M(a_p+i)$.

It is worth noting that the number $N_{OP}$ of mask additions, (XOR operations on R-bit masks), and thus the speed of the method, is dependent on n and R only and is independent on the specific choice of scale weights $S_j$.

In fact, the total number $N_{OP}$ of XOR operations in the method is less than the maximal number given by (n−1)·(R−1) since some of the binary coefficients $c_i$ are zero and no corresponding mask addition is needed for them.

The total number of masks required by the method of FIG. 6 is derived in Appendix B and summarized in the following table:

| Scale | Masks | Indices | Size of look-up table (in R-bit masks) |
|---|---|---|---|
| 0 | $M(d_0)$ | $d_0 = R, \ldots, K_0 + R - 2$ | $K_0 - 1$ |
| $0 < j < n - 1$ | $M(S_i d_j + i)$ | $d_j = 1, \ldots, K_j - 1$<br>$i = 0, \ldots, R - 1$ | $R(K_j - 1)$ |
| $n - 1$ | $M(S_{n-1} d_{n-1})$ | $d_{n-1} = , \ldots, K_{n-1} - 1$ | $K_{n-1} - 1$ |

It will be appreciated that for the particular case of a 2-scale representation (n=2), no masks for scale j are needed and the corresponding row must be ignored.

Adding the number of masks for each scale in the preceding table, the size of the look-up table (in masks) is given by a function $f$:

$$f(K_0, \ldots K_{n-1}) = (K_0 - 1) + R\sum_{j=1}^{n-2} (K_j - 1) + (K_{n-1} - 1) \quad \text{(Eq. 13)}$$

In order to minimize the size of the look-up table, the function $f$ needs to be minimized subject to the constraint given in Eq. 7 and the additional restrictions that $K_j > 2$ for $j = 1, \ldots, n-1$.

As derived in Appendix C, the minima(size of the look-up table occurs when:

$$K_0 = \hat{K}_0 \equiv R^{1-\frac{2}{n}} N^{\frac{1}{n}} \quad \text{(Eq. 14)}$$

$$K_j = \hat{K}_j \equiv R^{-\frac{2}{n}} N^{\frac{1}{n}} \text{ for } j = 1, \ldots, n-2,$$

$$K_{n-1} = \hat{K}_{n-1} \equiv R^{1-\frac{2}{n}} N^{\frac{1}{n}}$$

and the minimal size is given by:

$$\text{MEMORY}(a) = nR^{1-2/n} N^{1/n} - R(n-2) - 2. \quad \text{(Eq. 15)}$$

It will be appreciated by persons skilled in the art that the size of the look-up table, MEMORY(n), decreases as n increases. This reduction of memory is the main objective for using a many-scale approach.

As an example, when N is chosen to be on the order of $2^{18}$, R is 18 and n is 2 (a 2-scale representation), the minimal memory size is 1022, as explained hereinabove. However, if n is 4 (a 4-scale representation), the minimal memory size is 346.

The solution of Eq. 15 minimizes the function $f$ subject to the constraint of Eq. 7. However, the additional restrictions that $K_j > 2$ for $j=1, \ldots, n-1$ still need to be satisfied.

For the 2-scale representation (n=2), the size of the look-up table is MEMORY(2)=$2N^{1/2}-2$. The constraints $K_0 \geq 2$, $K_1 \geq 2$ are satisfied automatically for every $N \geq 4$, which is always satisfied in practical applications where the actual values of N are large.

For the general n-scale representation, n>2, the constraints $K_j \geq 2$ for $j=1, \ldots, n-1$ are reduced to constraints for the intermediate $K_j \geq 2$; namely to $R^{-2/n}N^{1/n} \geq 2$. (The constraint $R^{1-2/n}N^{1/n} \geq 2$ for $K_0$ and $K_1$ is then automatically satisfied since R>1.)

The constraint finally has the form $$n < \lceil n_{max} \rceil, \qquad (Eq.\ 16)$$

where $n_{max} \equiv \log_2(N/R_2)$ and $\lceil y \rceil$ symbol denotes the closest integer larger than or equal to y. Similarly, the symbol $\lfloor y \rfloor$, which is used hereinbelow, denotes the closest integer less than y.

Therefore, for any n which is less than $\lceil n_{max} \rceil$, code the constraints are satisfied automatically.

It is further assumed that $N>4R^2$. (Otherwise N is a rather small decay. In practical applications, N is of order $2^k$ and thus $N>4R^2$ is always satisfied in practice. Nevertheless, if $N>4R^2$ is not satisfied, the 2-scale approach described hereinabove may still be used and handles such delays with no more than 4R-2 masks.)

The final step is the determination of the integer values of constraints $K_j$ for $j=1, \ldots, n-1$. Each $K_j$ is selected from the two choices $\{K^-_j, K^+_j\}$ where $$K^-_j = \max(\lfloor \hat{K}_j \rfloor, 2),\ K^+_j = \max(\lceil \hat{K}^+_j \rceil, 2), j=1, \ldots, n-1 \qquad (Eq.\ 17)$$

such that $$\prod_{j=0}^{n-1} K_j \geq N \qquad (Eq.\ 18)$$

and the function $f$ given by Eq. 13 is minimal over all these choices. The condition given in Eq. 18 means that it must be possible to calculate delays of up to N: less is forbidden but more does no harm.

The choices given in Eq. 17 are written in such a form as to guarantee that $K_j \geq 2$ for $j=1, \ldots, n-1$. Therefore it is possible to extend Eq. 16 to $$n \cong \lceil n_{max} \rceil. \qquad (Eq.\ 19)$$

It will be appreciated that the choices $K_j = K^+_j$ for $j=1, \ldots, n-1$ always satisfy the inequality of Eq. 18 and are thus an appropriate solution. However, it is not the optimal solution, since it results in the maximal value for the memory size, which is represented by function $f$ given by Eq. 13, from all the possible choices $\{K^-_j, K^+_j\}$.

Figure 7:
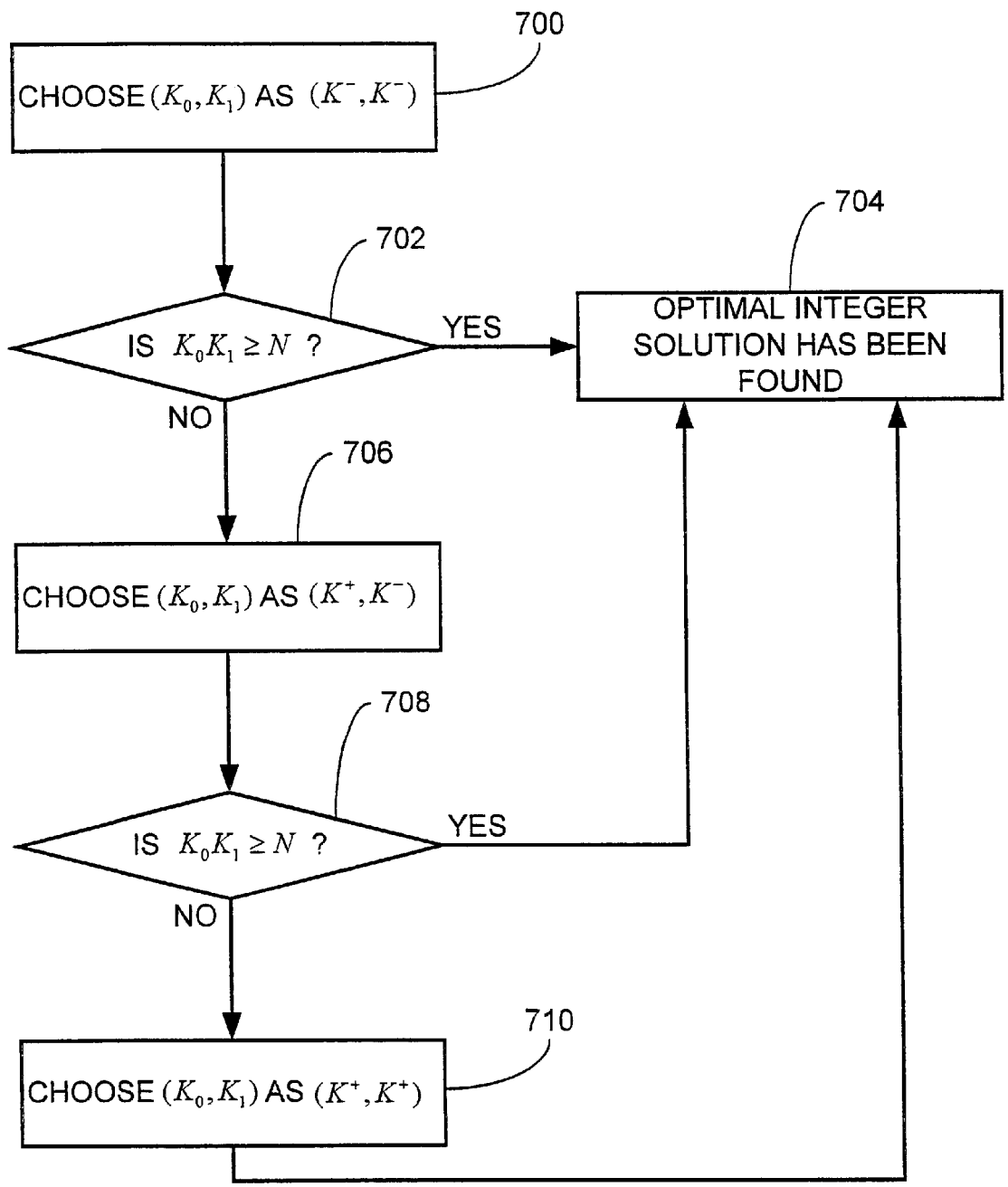
FIG. 7 is a flowchart illustration of a method for choosing, in the case of a 2-scale representation, the number of elements in each scale that will minimize the size of the look-up table subject to constraints, in accordance with a preferred embodiment of the present invention.
Figure 8:
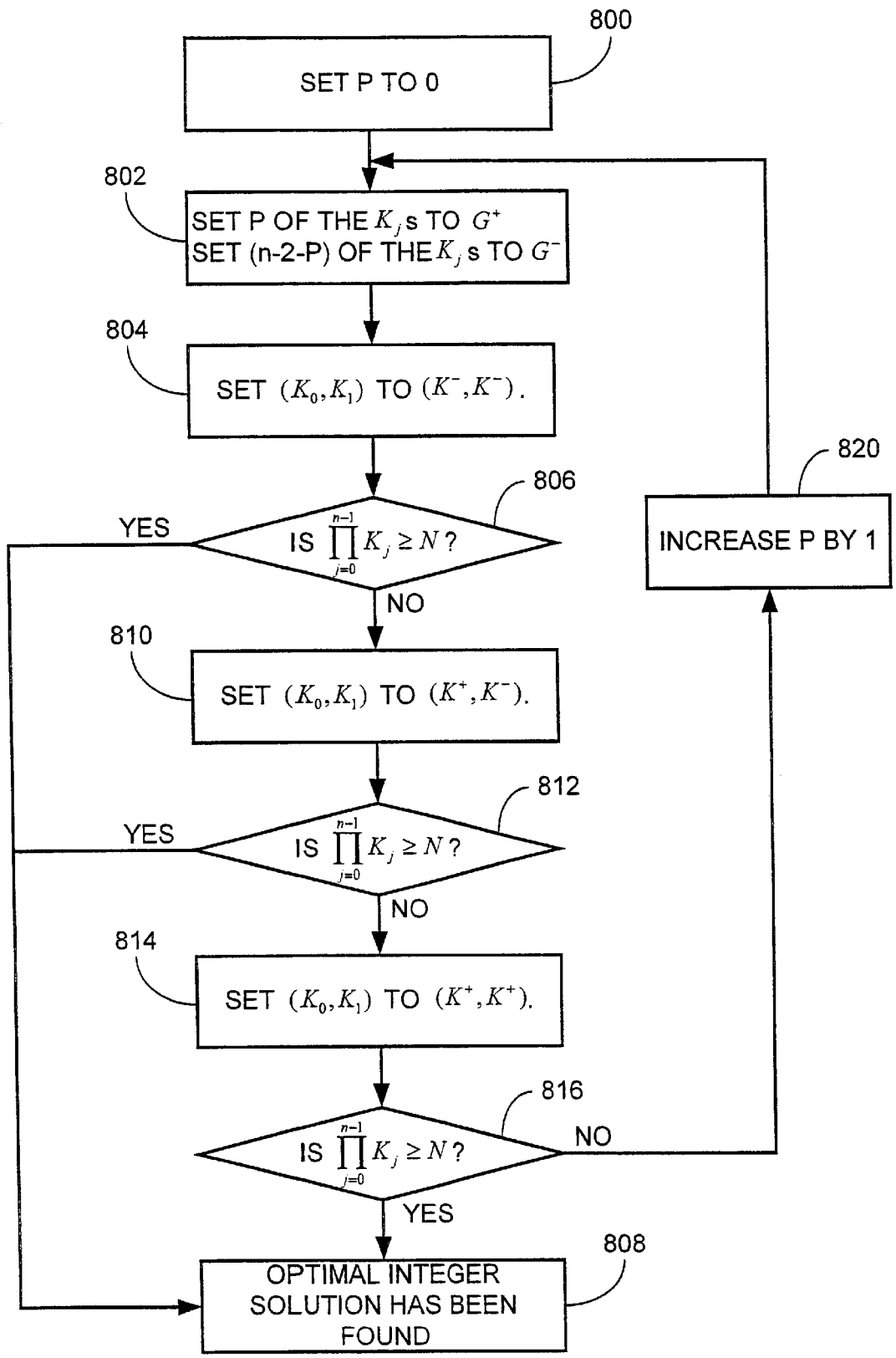
FIG. 8 is a flowchart illustration of a method for choosing, in the case of a general n-scale representation, the number of elements in each scale that will minimize the size of the look-up table subject to constraints, in accordance with a preferred embodiment of the present invention.

Reference is now made to FIGS. 7 and 8, which are flowchart illustrations of methods for choosing the values for $K_j$ that will minimize the function $f$ from all the possible choices code $\{K^-_j, K^+_j\}$, in the case of 2-scale representation (n=2) and a general n-scale representation (n>2), respectively, in accordance with a preferred embodiment of the present invention.

In the case of a 2-scale representation, $\hat{K}_0$ and $\hat{K}_1$ are both equal to $N^{1/2}$, and the possible choices for $K_0$ and $K_1$ are $K^- = \lfloor N^{1/2} \rfloor$ and $K^+ = \lceil N^{1/2} \rceil$.

The restriction of Eq. 18 is therefore $$K_0 K_1 \geq N, \qquad (Eq.\ 20)$$

and the memory to minimize is given by $$f(K_0, K_1) = K_0 + K_1 - 2. \qquad (Eq.\ 21)$$

There are four choices for $(K_0, K_1)$:

$$(K^-, K^-),\ (K^-, K^+),\ (K^+, K^-)\ \text{and}\ (K^+, K^+) \qquad (Eq.\ 22)$$

but due to the symmetry of Eq. 20 and Eq. 21 it is sufficient to consider only three of them:

$$(K^-, K^-),\ (K^+, K^-)\ \text{and}\ (K^+, K^{30}). \qquad (Eq.\ 23)$$

Thus the optimal integer solution from the set of choices given in Eq. 23 which minimizes Eq. 21 subject to the constraint Eq. 20 may be found according to the method in FIG. 7.

Choose $(K_0, K_1)$ as $(K^-, K^-)$ (step 700). Check whether Eq. 20 is satisfied by this choice (step 702). If so, then the optimal integer solution has been found (step 704). If not, then choose $(K_0, K_1)$ as $(K^+, K^-)$ (step 706). Check whether Eq. 20 is satisfied by this choice (step 708). If so, then the optimal integer solution has been found (step 704). If not, then choose $(K_0, K_1)$ as $(K^+, K^+)$ (step 710). The optimal integer solution has been found (step 704). Since steps 700, 706 and 710 are for values that result in progressively larger memories, the method indeed selects the optimal integer solution from the set of choices given in Eq. 23.

In the case of a general n-scale representation (n>2), the method shown in FIG. 8 is used. As given in Eq. 14, $\hat{K}_0$ and $\hat{K}_1$ are both equal to $K \equiv R^{1-2/n}N^{1/n}$, and $\hat{K}_j$ is equal to $G \equiv R^{-2/n}N^{1/n}$ for $j=1, \ldots, n-2$. It is convenient to introduce the following possible choices for K and G:

$$K^- = \max(\lfloor K \rfloor, 2),\ K^- = \max(\lceil K \rceil, 2),\ G^- = \max(\lfloor G \rfloor, 2)\ \text{and}$$
$$G^+ = \max(\lceil G \rceil, 2). \qquad (Eq.\ 24)$$

It will be appreciated that changing any of the $K_j$ for $j=1, \ldots, n-2$ by 1 will result in a change of the function $f$ given by Eq. 13 by a factor R.

Therefore, it is necessary to try to keep these $K_j$ as small as possible by having as many of them as possible to be $G^-$.

FIG. 8 shows a method according to a preferred embodiment of the present invention for minimizing the function $f$ given by Eq. 13 subject to the constraint of Eq. 18 from the set of choices given by Eq. 24. Set an index P to 0 (step 800). Then set any P of the $K_j$ to $G^+$ and the remaining (n-2-P) of the $K_1$s to $G^-$ (for $j=1, \ldots, n-2$) (step 802). Then set $(K_0, K_1)$ to $(K^-, K^-)$ (step 804). Check whether these values of $K_j$ for $j=0, \ldots, n-1$ satisfy the constraint of Eq. 18 (step 806). If so, then the optimal integer solution has been found (step 808). If not, then set $(K_0, K_1)$ to $(K^-, K^-)$ (step 810). Check whether these values of $K_j$ for $j=0, \ldots, n-1$ satisfy the constraint of Eq. 18 (step 812). If so, then the optimal integer solution has been found (step 808). If not, then set $(K_0, K_1)$ to $(K^+, K^+)$ (step 814). Check whether these values of $K_j$ for $j=0, \ldots, n-1$ satisfy the constraint of Eq. 8 (step 816). If so, then the optimal integer solution has been found (step 808). If not, then increase P by 1 step 820) and resume the method from step 802.

While certain features of the invention have been illustrated and described herein, many modifications, substitutions, changes, and equivalents will now occur to those of ordinary skill in the art. It is, therefore, to be understood that the appended claims that follow the appendices are intended to cover all such modifications and changes as fall within the true spirit of the invention.

APPENDIX A

The mask for a delay $d=a+b$ will be calculated in this appendix from other masks.

It is clear that the following identity is true:

$$X^{a+b} \bmod h(X) = X^a(X^b \bmod h(X)) \bmod h(X). \tag{Eq. A9}$$

Since $h(X)$ is a polynomial of degree R, $X^b \bmod h(X)$ is a polynomial of degree less than or equal to R–1 and may be represented as follows:

$$X^b \bmod h(X) = \sum_{i=0}^{R-1} c_i X^i, \tag{Eq. A2}$$

where due to the modulus 2 arithmetic, the coefficients $c_i$ are binary numbers.

Upon substitution of Eq. A2 into Eq. A1, the identity of Eq. A1 becomes:

$$X^{a+b} \bmod h(X) = X^a \left( \sum_{i=0}^{R-1} c_i X^i \right) \bmod h(X) = \sum_{i=0}^{R-1} c_i (X^{a+i} \bmod h(X)), \tag{Eq. A3}$$

which may be written as:

$$M(a+b) = \sum_{i=0}^{R-1} c_i(b) M(a+i), \tag{Eq. A4}$$

where the sum means addition modulus 2(XOR).

APPENDIX B

The total number of masks required by the method of FIG. 8 is summarized in the following table:

| Scale | Masks | Indices | Size of look-up table (in R-bit masks) |
|---|---|---|---|
| 0 | $M(d_0)$ | $d_0 = R, \ldots, K_0 + R - 2$ | $K_0 - 1$ |
| $0 < j < n - 1$ | $M(S_j d_j + i)$ | $d_j = 1, \ldots, K_j - 1$ $i = 0, \ldots, R - 1$ | $R(K_j - 1)$ |
| $n - 1$ | $M(S_{n-1} d_{n-1})$ | $d_{n-1} = , \ldots, K_{n-1} - 1$ | $K_{n-1} - 1$ |

The method of FIG. 6 requires the following masks: $M(S_j d_j + i)$ for every $d_j = 1, \ldots, K_j - 1$ for each scale ($j = 1, \ldots, n-2$) and for $i=0, \ldots, R-1$ as well as the mask $M(S_{n-1} d_{n-1})$ for every $d_{n-1} = 1 K_{n-1} - 1$.

Masks $M(S_j d_j)$ for $d_j = 0$ for each scale ($j=1, \ldots, n-1$) need not be saved since they are the mask $M(0)$ which belongs to the 0-scale mask family.

The number of 0-scale masks is not $R(K_0-1)$ but rather $K_0-1$. This is a consequence of the following:

a) The delay $d_0+i$ for $i=0, \ldots, R-1$ belongs to the same scale as $d_0$. Therefore, the number of 0-scale masks needs to be extended from $M(d_0)$ for $d_0=1, \ldots, K_0-1$ to $d_0=1, \ldots, K_0-1, K_0, \ldots, K_0+R-2$ by adding R–1 additional masks. Thus the total number of required 0-scale masks becomes $K_0+R-1$.

b) However, not all of these masks need to be stored in the look-up table. The first R masks may be generated on the fly. Since in the polynomial representation $M(d) = X^d \bmod h(X) = X^d$ for every $d<R$, the masks for delays $d<R$ have the following simple representation for the binary coefficients:

$$c_i(d) = \delta_{i,d} = \{0 \text{ for } \neq d, 1 \text{ for } = d'\} \tag{Eq. B1}$$

where $d=0, \ldots, R-1$ and $i=0, \ldots, R-1$. Therefore, it is needed to store only the following $K_0-1$ masks in the look-up table: $M(d_0)$ for $d_0=R, \ldots, K_0+R-2$.

APPENDIX C

The size of the look-up table (in masks) is given by a function $f$:

$$f(K_0, \ldots K_{n-1}) = (K_0 - 1) + R \sum_{j=1}^{n-2} (K_j - 1) + (K_{n-1} - 1) \tag{Eq. C1}$$

In order to minimize the size of the look-up table, the function $f$ needs to be minimized subject to the constraint:

$$N = \prod_{j=0}^{n-1} K_j \tag{Eq. C2}$$

and the additional constraints:

$$K_j \geq 2 \text{ for } j=1, \ldots, n-1. \tag{Eq. C3}$$

Introducing new variables, $$x_0 = K_0,$$

$$x_j = R K_j \text{ for } j=1, \ldots, n-2,$$

$$x_{n-1} = K_{n-1} \tag{Eq. C4}$$

the function $f$ may he rewritten as $$f(x_0, \ldots x_{n-1}) = \sum_{j=0}^{n-1} x_j + const \tag{Eq. C5}$$

under the constraint $$\prod_{j=0}^{n-1} x_j = R^{n-2} N \tag{Eq. C6}$$

and subject to the additional constraints $$x_0 \geq 2, K \geq 2 \text{ for } j=1, \ldots, n-1, \text{ and } x_{n-1} \geq 2. \tag{Eq. C7}$$

The space of the K-variables will be referred to as the K-space and the space of the x-variables as the x-space. While the use of standard techniques of constrained minimization (for example, using Lagrange multipliers) may be applied, it is much simpler to reformulate the problem in geometrical terms. In the x-space, a geometrical interpretation is readily available. There is an n-dimensional parallelepiped having a fixed volume (Eq. C6) whose perimeter is to be minimized (Eq. C5). The solution is an n-dimensional hypercube. All sizes are equal to a value denoted $\hat{x}$:

$$\hat{x}_0 = \ldots = \hat{x}_{n-1} \equiv \hat{x}. \tag{Eq. C8}$$

Due to the "volume" constraint (Eq. C6), $\hat{x}^n = R^{n-2}N$, hence $\hat{x} = R^{1-2/n}N^{1/n}$.

In the K-space, this solution is written as:

$$K_0 = R^{1-2/n}N^{1/n},$$

$$K_j = R^{-2/n}N^{1/n} \text{ for } j=1, \ldots, n-2,$$

$$K_{n-1} = R^{1-2/n}N^{1/n} \quad \text{(Eq. C9)}$$

Substitution of Eq. C9 into Eq. C1 gives the following expression for the minimal size of the look-up table:

$$\text{MEMORY}(n) = nR^{1-2/n}N^{1/n} - R(n-2) - 2. \quad \text{(Eq. C10)}$$

What is claimed is:

1. A method for calculating the mask for an arbitrary delay of a pseudo-noise sequence, the method comprising:

having an n-scale representation of delays, where n is at least 2;

having stored masks for predetermined delays based on said n-scale representation;

selecting ones of said stored masks based at least in part on a decomposition of said arbitrary delay according to said n-scale representation; and XOR adding said selected masks.

2. A method according to claim 1, wherein n is 2 and said step of selecting comprises the steps of:

decomposing said arbitrary delay as a sum of a first delay and a second delay; and selecting ones of said stored masks based on said second delay and on binary coefficients of the stored mask for sell first delay.

3. A method according to claim 1, wherein n is greater than 2 and said step of selecting comprises the steps of decomposing said arbitrary delay according to said n-scale representation;

calculating at least one intermediate mask based on at least said decomposition; and selecting ones of said stored masks based on said decomposition and on binary coefficients of said intermediate mask.

4. A method comprising:

decomposing a delay of a pseudo-noise sequence according to a representation of delays;

selecting, based at least in part upon a decomposition resulting foam decomposing said delay, particular masks from a group of masks, that have been calculated prior to having knowledge of said delay, said group of masks comprising masks for predetermined delays based on said representation; and XOR adding said particular masks.

5. A method comprising:

calculating a mask for an arbitrary delay of a pseudo-noise sequence whose shift resister polynomial is of order R using no more than a number of operations that is independent of the arbitrary delay and that is on the order of R.

6. The method of claim 5, wherein said operations are (XOR) addition operations on masks that were calculated prior to having knowledge of said arbitrary delay.

7. The method of claim 5, wherein calculating said mask comprises:

decomposing said arbitrary delay according to an n-scale representation of delays, where n is at least 2; and XOR adding masks for predetermined delays based on said n-scale representation, said masks having been calculated prior to having knowledge of said arbitrary delay.

* * * * *